United States Patent [19]
Faludy

[11] Patent Number: 5,148,849
[45] Date of Patent: Sep. 22, 1992

[54] LIGHTED RETRACTABLE AWNING

[75] Inventor: Thomas G. Faludy, Westminister, Colo.

[73] Assignee: Carefree/Scott Fetzer Company, Broomfield, Colo.

[21] Appl. No.: 618,158

[22] Filed: Nov. 26, 1990

[51] Int. Cl.⁵ .............................................. E04F 10/06
[52] U.S. Cl. ...................................... 160/67; 160/10; 160/127
[58] Field of Search ....................... 160/66, 67, 68, 69, 160/70, 71, 72, 73, 74, 75, 22, 10, 127, 310, 133; 362/151, 152; 135/89, 91, 910

[56] References Cited

U.S. PATENT DOCUMENTS

| | | | |
|---|---|---|---|
| 1,587,721 | 6/1926 | Goldberg | 160/10 |
| 1,779,764 | 10/1930 | Dasch | 160/10 |
| 2,478,699 | 8/1949 | Lange | 160/127 |
| 2,640,143 | 5/1953 | Malone | 362/152 |
| 3,923,074 | 12/1975 | McKee | 160/68 X |
| 4,077,419 | 3/1978 | Lux | 160/68 X |
| 4,161,769 | 7/1979 | Elliott | 362/152 X |
| 4,807,684 | 2/1989 | Melton | 160/133 X |

FOREIGN PATENT DOCUMENTS 740748  8/1966  Canada ............................... 362/152

Primary Examiner—David M. Purol

[57] ABSTRACT

A lighted retractable awning includes a roll bar about which a canopy can be rolled with the roll bar having an elongated recess therein adapted to receive a light source. The light source includes an electrical cord having a plug on one end adapted to be received in an electrical outlet in a support surface on which the awning is mounted.

6 Claims, 3 Drawing Sheets

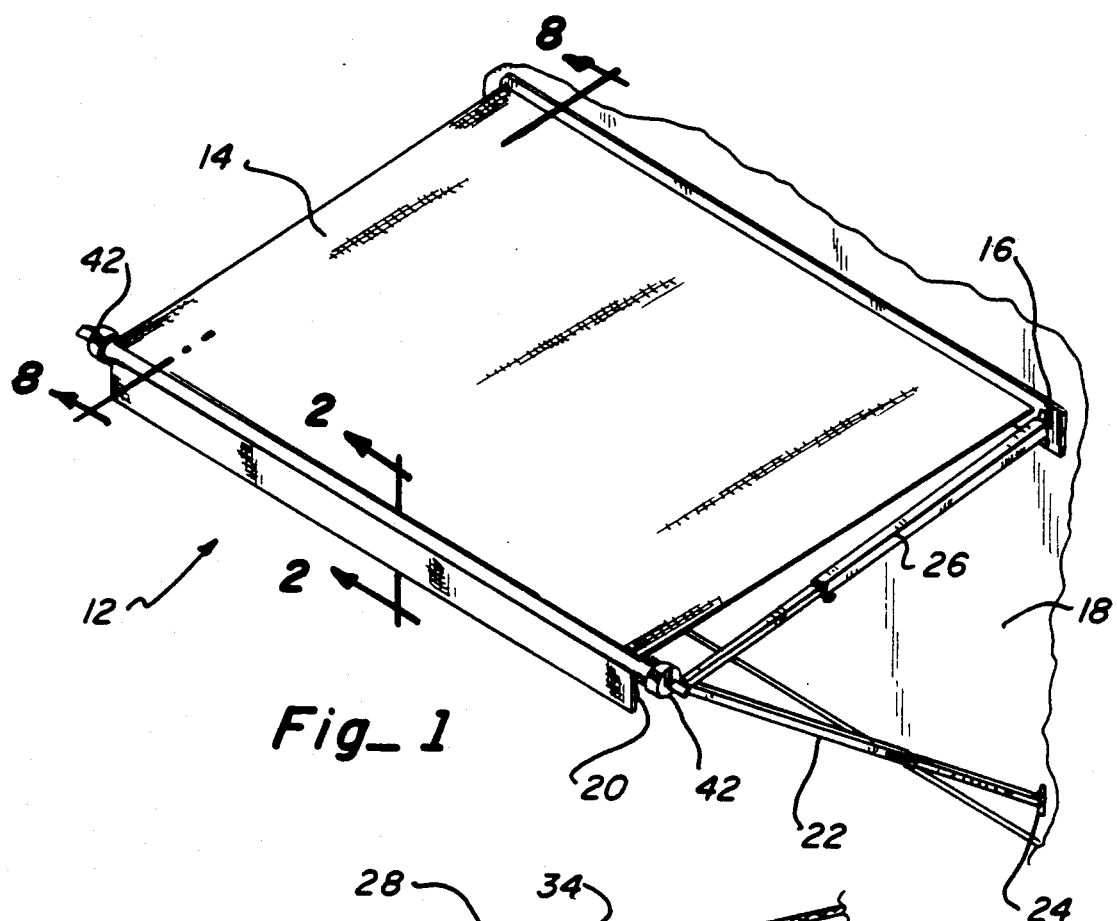
Fig_1
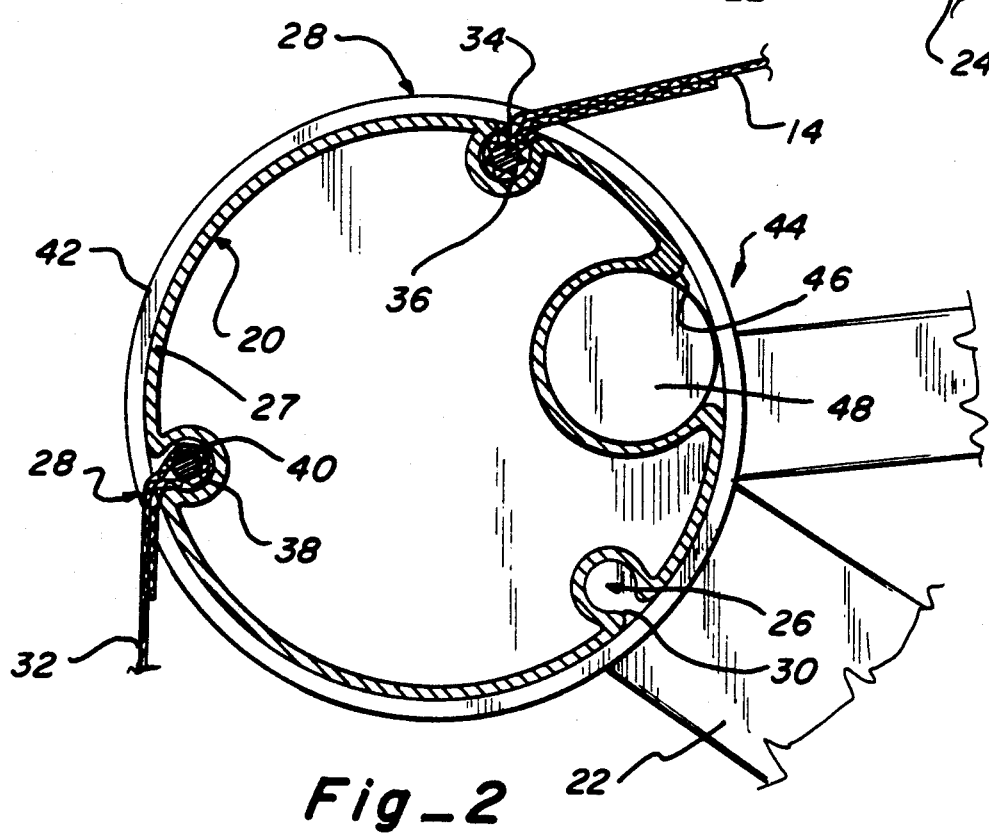
Fig_2

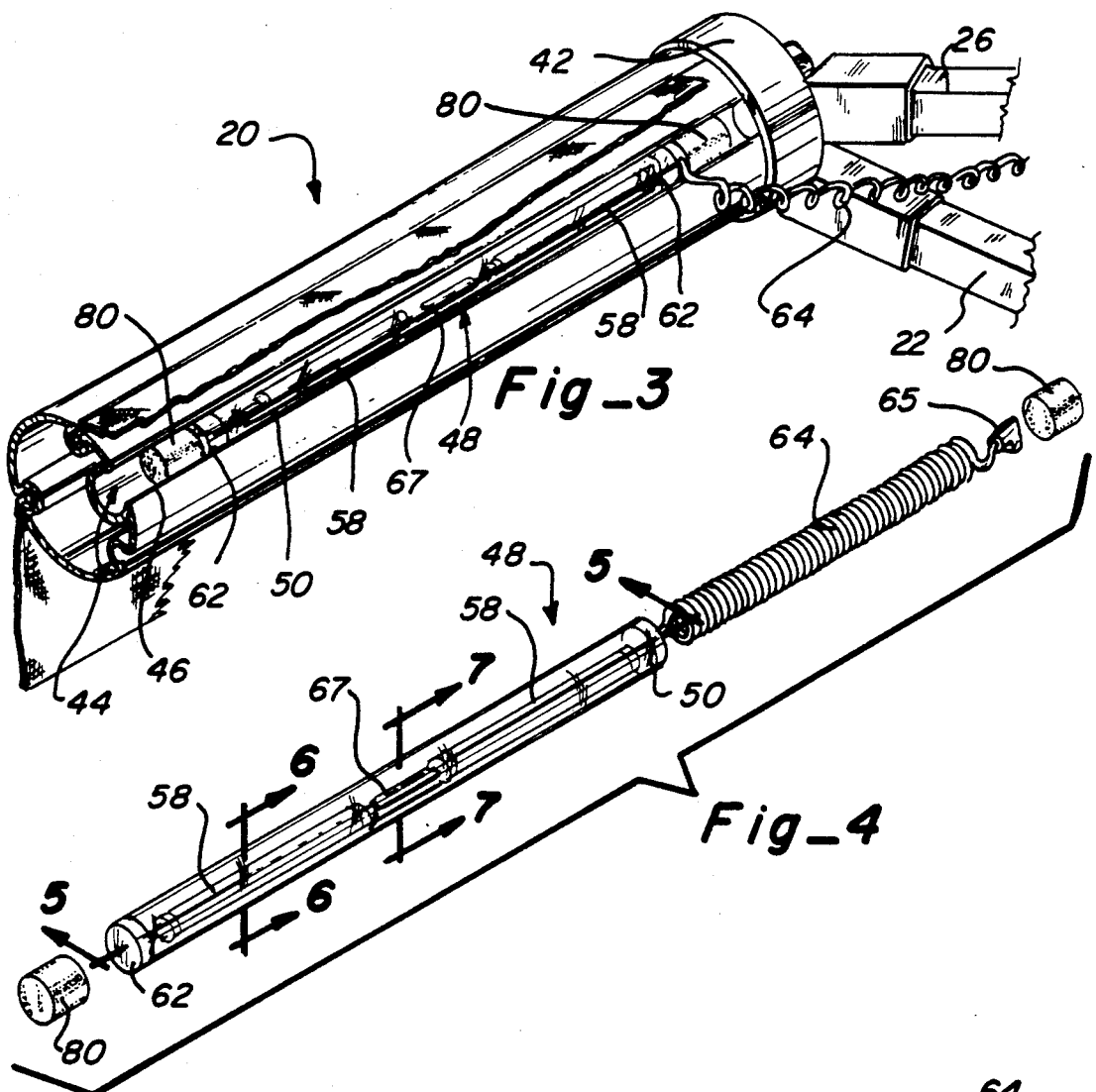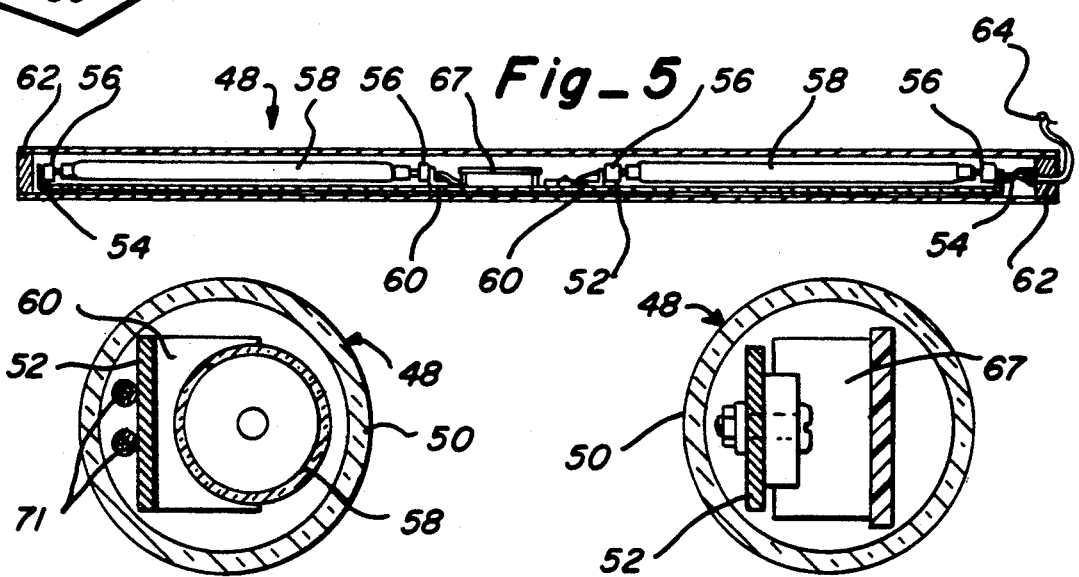

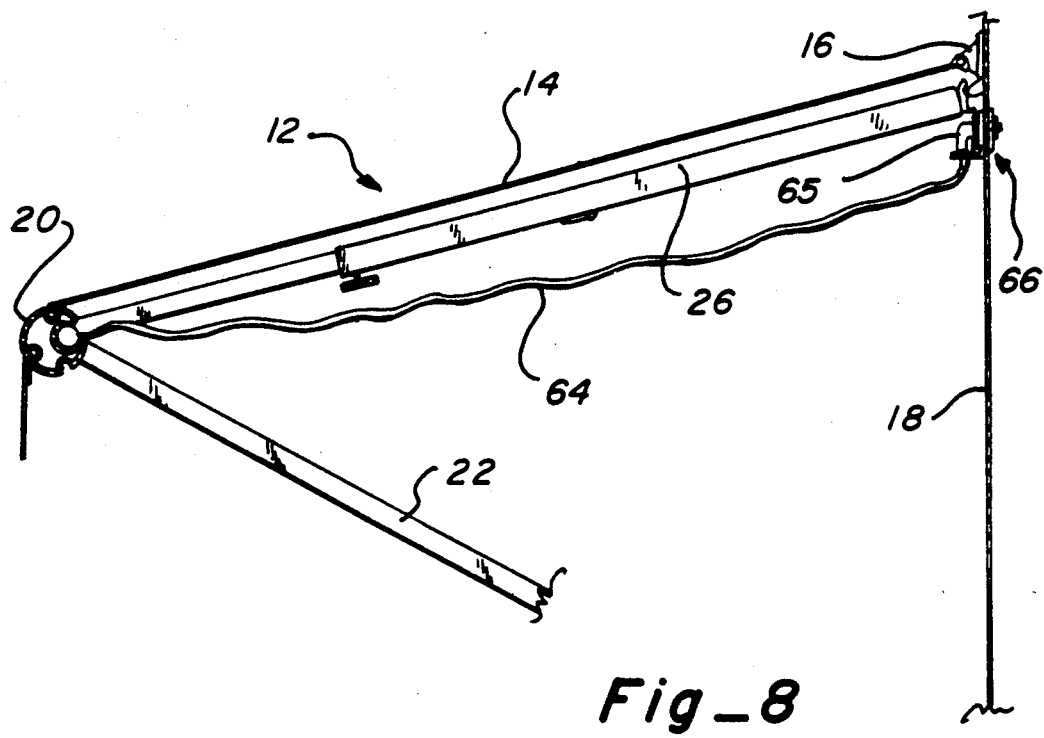
Fig_8
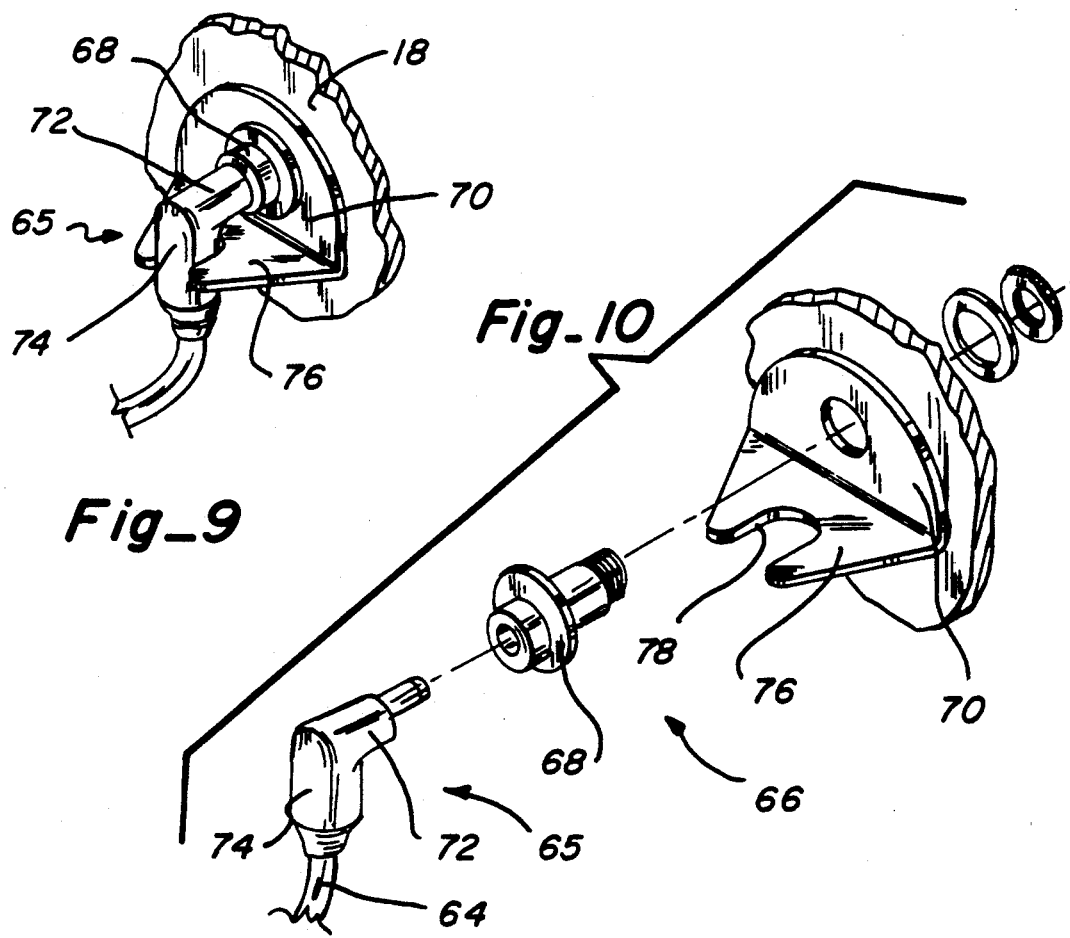
Fig_9
Fig_10

LIGHTED RETRACTABLE AWNING

BACKGROUND OF THE INVENTION

1. Field of the Invention

The present invention relates generally to retractable awnings and more particularly to an improved retractable awning wherein a light source is provided therein to illuminate the area under the awning

2. Description of the Prior Art

Retractable awnings may take numerous forms and have been designed for permanent mounting on fixed vertical surfaces such as over doors and windows of a building structure and have also been designed for mounting on movable objects such as recreational vehicles, mobile homes or the like. In the latter case, the awnings typically include a canopy that is secured along an inner edge to a supporting external wall of the vehicle and along an opposite parallel edge to a roll bar such that as the roll bar is moved away from the supporting surface, the canopy of the awning is extended. A reverse relationship is sometimes utilized wherein the roll bar is permanently mounted on the supporting surface and a lead bar attached to an opposite edge of the canopy is adapted to be extended away from the supporting surface to move the awning into an extended position. In either instance, however, the awning is wrapped around the roll bar when in its retracted condition. Support arms and rafters are typically provided to retain the awning in its extended condition.

It is frequently desirable when seated under an extended awning of the afore-noted type to have a light source so that activities requiring light can be carried on at night beneath the awning. Typically, outdoor lanterns have been utilized as have flashlights. In some instances, recreational vehicles on which the awning may be mounted have a door light on a wall adjacent to an entry door. Such means for illuminating the area beneath the awning, however, are undesirable for varied reasons and accordingly there has been a long felt need for a convenient light source that will readily illuminate the area beneath a retractable awning.

It is to satisfy the needs and desires of recreational vehicle users in having a satisfactory system for illuminating the area beneath the awning that the subject invention has been developed.

SUMMARY OF THE INVENTION

In the present invention the improvement resides in a convenient and practical system for illuminating a retractable awning so as to provide light beneath the awning when desired. The illumination is obtained in a unique manner by utilizing the roll bar of the awning to house a light source which is automatically exposed to the area beneath the awning when the awning is in its extended condition.

More specifically, the roll bar for the awning is provided with an elongated recess which is formed in an outer surface of the roll bar at a location wherein the recess opens toward the area beneath the canopy when the awning is extended. The recess is configured to receive and retain the light source whereby upon energization of the light source, the area beneath the canopy can be illuminated.

Other aspects, features and details of the present invention can be more completely understood by reference to the following detailed description of a preferred embodiment, taking in conjunction with the drawings, and from the appended claims.

BRIEF DESCRIPTION OF THE DRAWINGS

FIG. 1 is an isometric view of a retractable awning in an extended condition incorporating the illuminating means of the present invention.

FIG. 2 is an enlarged section taken along line 2—2

FIG. 3 is a fragmentary isometric view of the roll bar for the retractable awning with parts removed for clarity illustrating a light source incorporated into the roll bar.

FIG. 4 is an isometric view of the light source utilized in the retractable awning of the present invention and showing compressible plugs for holding the light source in position within the roll bar.

FIG. 5 is a section taken along line 5—5 of FIG. 4.
FIG. 6 is a section taken along line 6—6 of FIG. 4.
FIG. 7 is a section taken along line 7—7 of FIG. 4.
FIG. 8 is a section taken along line 8—8 of FIG. 1.

FIG. 9 is an enlarged isometric view illustrating the connection of the light source to an outlet mounted on the side wall of a recreational vehicle or the like.

FIG. 10 is an exploded isometric view of FIG. 9 showing the plug and outlet for connecting the light source to a supply of electricity.

DESCRIPTION OF THE PREFERRED EMBODIMENT

With reference to FIG. 1, a retractable awning 12 in accordance with the present invention can be seen to include a rectangularly shaped canopy 14 secured along an inner edge to a mounting rail 16 on the vertical side wall or supporting surface 18 of a recreational vehicle. The opposite edge of the canopy is secured in a roll bar 20 so that the canopy 14 can be rolled around the roll bar when retracting the canopy into a stored or retracted position adjacent to the side of the vehicle. A pair of longitudinally adjustable support arms 22 extend between the ends of the roll bar and brackets 24 provided along a lower edge of the supporting surface 18. The support arms 22 are adapted to be disconnected from the brackets 24 and can be moved into a substantially vertical orientation (not illustrated) beneath the ends of the roll bar 20 with the lower ends of the support arms resting on the ground. A pair of rafter arms 26, which are storable within the support arms 22, assist in retaining the awning in an extended position. The rafter arms extend between the roll bar 20 and mounting rail 16 when the awning is extended.

As is probably best seen in FIGS. 2 and 3, the roll bar 20 is of generally hollow tubular construction. The roll bar has a cylindrical wall 27 in which is formed three circumferentially spaced small elongated recesses 28. The recesses are generally cylindrical in configuration and open laterally through elongated slots 30 in the outer surface of the cylindrical wall 27. Each slot 30 has a smaller width than the diameter of the associated recess 28 so that the small elongated recesses define ideal means by which the roll bar can be secured to the canopy 14 and also to a valance 32 or other decorative component of the awning in a conventional manner.

The connection of the canopy 14 to the roll bar 20 is accomplished by first forming an elongated casing 34 along the outer edge of the canopy by folding the edge back over itself and hemming. The edge with the casing formed therein is then inserted through a slot 30 into one of the small recesses 28. Subsequently, an elongated rod 36 which may be rigid or flexible, and having a diameter slightly smaller than the diameter of the recess 28 but greater than the width of the slot 30, is inserted longitudinally into the casing 34 and within the elongated recess to secure the edge of the canopy to the roll bar.

The valance is also secured to the roll bar in the same manner and accordingly would include a similar casing 38 formed along one edge thereof that is inserted into one of the other small recesses 28. Of course, the valance will be secured in position again by an elongated rigid or flexible rod 40 inserted longitudinally through the casing 38 and within the associated recess to secure the edge of the valance to the roll bar.

In a conventional manner, end caps 42 are secured to the roll bar 20 to facilitate a rotatable connection of the roll bar to the associated support arms 22 and rafter arms 26. The end caps are attached to the roll bar by inserting screw-type fasteners (not shown) through the ends caps and axially into the open ends of the recesses 28. Accordingly, three such fasteners can be inserted through each end cap and into the ends of the three small recesses at each end of the roll bar.

An important feature of the roll bar is the provision of a relatively large elongated utility recess 44 that is formed in the cylindrical wall 27 of the roll bar 20 so as to open laterally through the outer surface thereof. The utility recess 44 is provided immediately adjacent to the smaller recess 28 in which the edge of the canopy 14 is anchored and on the side of the roll bar which is beneath the canopy when the awning is extended. A slot 46 is defined in the outer surface of the cylindrical wall 27 of the roll bar where the relatively large recess 44 opens laterally through the wall. As will be appreciated, the diameter of the relatively large recess 44 is greater than the width of the slot 46 so that items can be retained in the slot if they are properly dimensioned.

In accordance with the present invention, an elongated tubular light source 48 is accommodated in the recess. The light source which is probably best illustrated in FIGS. 3 through 7 is of a type described in more detail in co-pending application Ser. No. 07/684,832 filed Apr. 15, 1991, entitled awning reel of light and is highly suitable for use in connection with the lighted retractable awning of the present invention. The disclosure in the afore-noted application is hereby incorporated by reference.

The light source 48 can be seen to include a transparent tubular body 50 of rigid plastic or the like having disposed therein an elongated, flat rigid mounting bar 52 which has upturn ends 54 on which conventional sockets 56 for tubular fluorescent light bulbs 58 are mounted. L-shaped brackets 60 are positioned in spaced relationship near the longitudinal center of the tubular body 50 and serve as a mounting post for another pair of conventional sockets 56 for receiving the opposite ends of the fluorescent bulbs. An insert 62 is provided in each end of the tubular body with the insert at one end of the body having a passage therethrough to receive an electrical cord 64 which is coiled in a conventional manner so that a DC plug 65 on the opposite end thereof can be extended to the side wall 18 of the vehicle on which the awning is mounted for reception in an outlet 66 to be described in more detail later.

Between the L-shaped brackets 60 and also mounted on the flat bar 52 is a DC to AC converter 67 which might include an oscillator, an amplifier and a transformer to convert, for example, a 12-volt DC source of electricity to an AC source for illuminating the fluorescent bulbs 58. As can be appreciated by reference to FIGS. 4 and 5, the light bulbs are axially aligned and are spaced by the AC to DC converter 67. Appropriate electrical wiring 71 connects the various components of the light source in a manner which can be more fully appreciated in the afore-noted co-pending application.

Reference is made to FIG. 8, wherein the cross section of the awning 12 shows the electrical cord 64 extending between the roll bar 20 and the outlet 66 mounted on the wall 18 of the recreational vehicle. The outlet 66, which is probably best shown in FIGS. 9 and 10, includes a conventional socket 68 which is secured in the wall 18 in any convenient manner and immediately adjacent to a mounting bracket 70. The DC plug 65, which is on the end of the electrical cord 64 and is adapted to be received in the outlet 66 in a conventional manner, is of generally L-shaped configuration defining a horizontal leg 72 and a vertical leg 74. The electrical cord which is connected to the vertical leg 74 extends at approximately a 90-degree angle away from the horizontal leg 72 of the plug which is adapted to be received in the socket 68.

The bracket 70 has a generally horizontal plate portion 76 with a notch 78 formed therein adapted to receive the vertical leg of the plug 65 to which the electrical cord is connected so that when the plug is received in the socket, the vertical leg 74 is received in the slot and prevented from rotation by the slot.

The bracket 70 is provided as it has been found that pivotal movement of the plug 65 about the axis of the horizontal leg 72 tends to loosen the connection of the plug to the socket 68 and might even allow the plug to be unintentionally removed from the socket. However, by preventing pivotal or rotative movement of the plug relative to the socket, the plug will remain dependably in the socket since any axial pulling movement that may be created along the length of the cord 64 is along a line which is laterally displaced from the axis of the horizontal leg 72 thereby placing the plug in a slight bind to prevent an inadvertent release of the plug from the socket.

The DC outlet 66 is of course connected in a conventional manner to a supply of electricity such as a 12-volt battery which is commonly found on recreational vehicles, mobile homes and the like. Accordingly, it will be readily appreciated that by merely inserting the plug 65 into the outlet 66, a supply of DC electrical current is passed to the tubular body 50 and ultimately through the DC to AC converter 67 to the light bulbs themselves.

The tubular body 50 is slightly smaller in diameter than the diameter of the recess 44 in which it is received so that it can be slid axially along the length of the recess to position the light source at any desired location. To hold the light source in a desired location within the recess 44, a pair of cylindrical anchors 80 made of a compressible foam are positioned at opposite ends of the light source and can be removed from the recess through the slot 46 in the side wall 27 of the roll bar. Since the anchors 80 are compressible, they can merely be reinserted adjacent to the ends of the light source when the light source is repositioned within the recess.

When traveling, the electrical cord 64 is allowed to self-coil and can be aligned axially with the tubular body 50 of the light source and completely confined within the recess 44. The cord will not fall out of the recess as the awning is being retracted due to the fact that the initial rolling movement of the roll bar will place the slot 46 against the underside of the canopy 14 so that the canopy will retain the cord within the recess.

Although the present invention has been described with a certain degree of particularity, it is understood that the present disclosure has been made by way of example, and changes in detail and structure may be made without the departing from the spirit of the invention, as defined in the appended claims.

I claim:

1. In a retractable awning of the type that is movable between an extended and a retracted condition, said awning having a flexible canopy, a rotatable roll bar secured to an edge of the canopy about which the canopy is rolled when the awning is in its retracted condition, wherein the improvement comprises a light source mounted on said roll bar and adapted to illuminate the area beneath the canopy when the awning is in its extended condition said light source being concealed by said canopy when the awning is in its retracted condition.

2. In the retractable awning of claim 1 wherein said roll bar has an elongated recess formed therein and wherein said light source is mounted within said recess.

3. In the retractable awning of claim 1 wherein said light source is electrical and includes means for connecting the light source to an electrical supply outlet.

4. In the retractable awning of claim 2 wherein said recess and light source are of generally cylindrical configuration and further including means for retaining said light source in said recess.

5. In the retractable awning of claim 4 wherein said light source is of slightly smaller diameter than said recess so as to be slidable within said recess.

6. In a retractable awning of the type that is movable between an extended and a retracted condition, said awning having a flexible canopy, an elongated rotatable roll bar secured to an edge of the canopy about which the canopy is rolled when the awning is in its retracted condition, said elongated roll bar having a side wall and a recess formed in the side wall along its length, said recess defining an elongated slot along the length of the roll bar opening laterally through said side wall, the width of said slot being smaller than the internal dimension of said recess, and a light source seated in said recess having a larger external dimension than the width of said slot whereby the light source is prevented from falling out of said recess through said slot.

* * * * *

UNITED STATES PATENT AND TRADEMARK OFFICE
CERTIFICATE OF CORRECTION

PATENT NO. : 5,148,849

DATED : September 22, 1992

INVENTOR(S) : Thomas G. Galudy,

It is certified that error appears in the above-identified patent and that said Letters Patent is hereby corrected as shown below:

```
Column 2, line 8:    "--line 2-2--" should read
                     -- line 2-2 of Fig. 1. --

Column 3, lines 43-44:  "--awning reel of light--"
                        should read -- Awning Reel Light --
```

Signed and Sealed this

Fifth Day of October, 1993

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,148,849
DATED : September 22, 1992
INVENTOR(S) : Thomas G. Faludy It is certified that error appears in the above-identified patent and that said Letters Patent is hereby corrected as shown below:

Column 2, line 8:  "--line 2-2-- should read
                   -- line 2-2 of Fig. 1. --

Column 3, lines 43-44:  "--awning reel of light--"
                        should read -- Awning Reel Light --

This certificate supersedes Certificate of Correction issued October 5, 1993.

Signed and Sealed this

Eleventh Day of January, 1994

Attest:

BRUCE LEHMAN

Attesting Officer    Commissioner of Patents and Trademarks